United States Patent
Blosser et al.

[15] 3,662,148
[45] May 9, 1972

[54] WELDING AID ATTACHMENT

[72] Inventors: Robert W. Blosser, 305 East Ridgewood Drive, Midwest City, Okla. 73110; Gordon L. Richard, 1400 Brookdale, Del City, Okla. 73115

[22] Filed: June 18, 1970

[21] Appl. No.: 47,525

[52] U.S. Cl. ............................................. 219/136, 219/130
[51] Int. Cl. ........................................................ B23k 9/30
[58] Field of Search ..................... 219/136, 130, 137, 131, 76

[56] References Cited

UNITED STATES PATENTS

| | | | |
|---|---|---|---|
| 2,866,081 | 12/1958 | Take | 219/130 X |
| 3,098,150 | 7/1963 | Inoue | 219/76 X |
| 3,182,178 | 5/1965 | Libby | 219/130 |
| 3,277,266 | 10/1966 | Blaskowski | 219/76 |
| 3,415,970 | 12/1968 | Cline | 219/76 X |
| 3,524,956 | 8/1970 | Rocklin | 219/76 |

*Primary Examiner*—J. V. Truhe
*Assistant Examiner*—J. G. Smith
*Attorney*—Dunlap, Laney, Hessin & Dougherty

[57] ABSTRACT

Apparatus for detachable affixture to or integral design in an electric arc welding manual electrode holder, the apparatus consisting of an electrically driven, lineally oscillatable vibratile element which is driven in synchronous relationship with current application to the electric arc welding electrode thereby to set up a uniform vibrational pattern of the welding electrode relative to a work piece in order both to avoid sticking and to insure uniformity of the welding bead.

5 Claims, 4 Drawing Figures

PATENTED MAY 9 1972  3,662,148
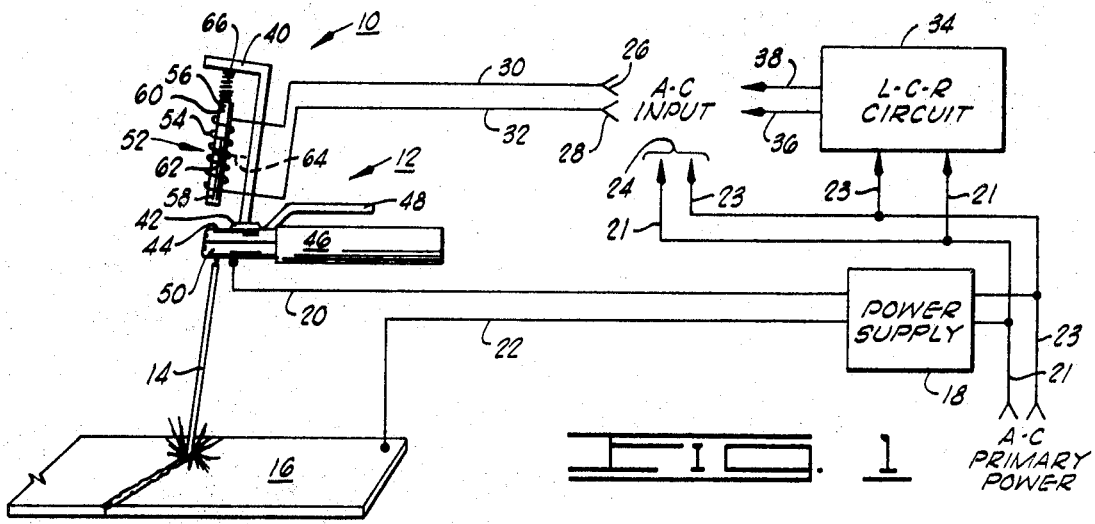
FIG. 1
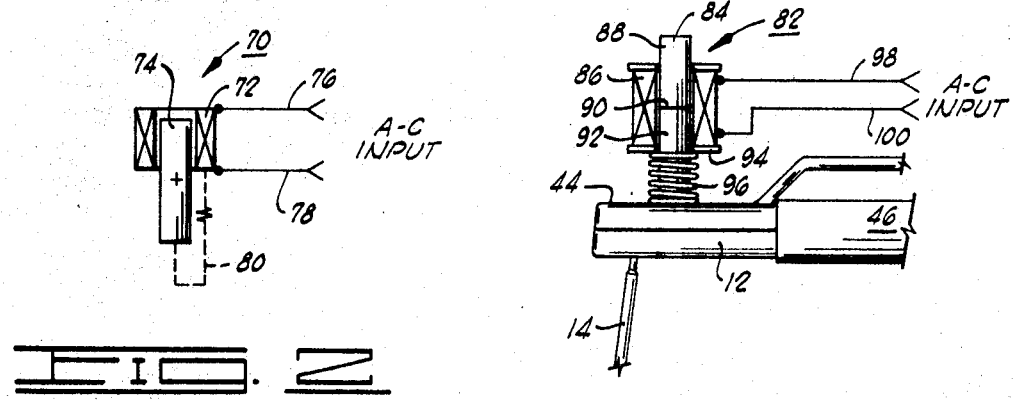
FIG. 2
FIG. 3
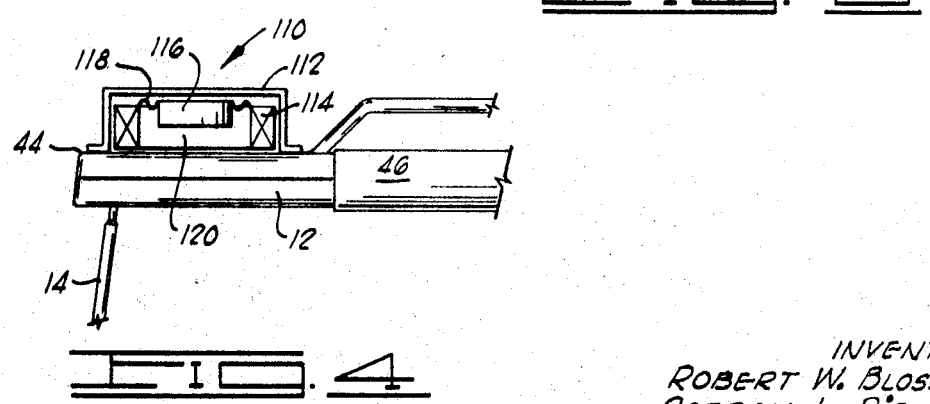
FIG. 4
INVENTORS
ROBERT W. BLOSSER &
GORDON L. RICHARD
BY
Dunlap, Laney, Hessin & Dougherty
ATTORNEYS

WELDING AID ATTACHMENT

BACKGROUND OF THE INVENTION

1. Field of the Invention

The invention relates generally to manual welding instruments and, more particularly, but not by way of limitation, it relates to additional structure to improve electric arc welding electrode holders of the type used for manual welding applications.

2. Description of the Prior Art

The prior art includes various types of welding aid which are intended to improve the bead formation and, in fact, the strength and proper formation of the weld seam itself, which prior devices generally take the form of apparatus for superimposing a super-audible frequency for the purpose of arc stabilization. For example, prior U.S. Pat. No. 2,399,377 teaches the employ of such high frequency imposition for purposes of arc stabilization. Prior U.S. Pat. No. 3,187,158 is also of interest as it discloses a series-type coil device formed as an integral part of the welding rod holding apparatus to provide means for moving the welding rod to and from the work piece in proportion to weld current changes or variations in current across the arc gap. Many other variations on the above-described basic forms of welding aid or attachment may be found in the related prior art classifications; however, such teachings do not contemplate the primary structure and functions of the present invention.

SUMMARY OF THE INVENTION

The present invention contemplates a vibratile welding aid for attachment to or integral design in a manual arc welding electrode holder. In a more limited aspect, the invention consists of a frame device for secure affixture to an electric arc welding electrode holder which frame provides housing for an electric coil having a lineally oscillatable core assembly spring-mounted therein, the electrical coil being connected to receive electrical energization in synchronization with the electrical input to the welding rod and work piece. The coil core assembly is composed and mounted such that it will oscillate lineally at twice the electrical input frequency to provide mechanical disposition of the welding rod tip between predetermined limits spaced perpendicularly from the work piece by an optimum amount.

Therefore, it is an object of the present invention to provide an electric arc welding device for enabling the novice welder to strike and maintain an arc through formation of a uniform, workman-like welding seam.

It is also an object of the present invention to provide an electric arc welding electrode holder which is easily constructed and affixed to welding equipment in place of the conventional electrode holder at minimal expense.

Finally, it is an object of the present invention to provide an arc welding attachment which is readily adaptable for detachable affixure to any of various conventional types of electric arc welding rod holders, to provide novel bead control functions.

Other objects and advantages of the invention will be evident from the following detailed description when read in conjunction with the accompanying drawing which illustrates the invention.

BRIEF DESCRIPTION OF THE DRAWING

FIG. 1 is a partially schematic representation of a general form of welding aid device as affixed in combination with a welding electrode holder;

FIG. 2 is an alternative form of coil and core structure which may be employed in the invention;

FIG. 3 illustrates yet another alternative form of coil and core structure; and

FIG. 4 illustrates still another alternative form of coil and core structure as affixed within a compact housing unit on a conventional welding electrode holder assembly.

DETAILED DESCRIPTION OF THE PREFERRED EMBODIMENT

Referring now to FIG. 1, a welding aid 10 is depicted in secure affixure to an electric arc welding electrode holder 12 which maintains a welding electrode or rod 14 in operative position to a work piece 16. Welding current is applied from a standard-type a-c power supply 18 via output leads 20 and 22 to the respective electrode holder 12 and work piece 16. In basic design, the a-c primary power input on leads 21 and 23 may be applied through a connector 24 for direct input to terminals 26 and 28 of respective input leads 30 and 32 as connected to energize the welding aid 10. In an alternative connection, primary power on leads 21 and 23 may be applied through an L-C-R circuit 34 which is adjustable to provide phase-shifted output on leads 36 and 38, as will be further described below.

The welding aid 10 includes a frame 40, shown schematically as an inverted L-shaped member which includes a base member 42 for secure affixure as by welding, thumb-screw clamp or other conventional fasteners to a suitable upper surface 44 of electrode holder 12. The electrode holder 12 may be a conventional form of electrode holder which includes an insulated handle 46, an actuating lever 48 and a suitable form of clampable rod-receiving end 50 (not specifically shown).

A coil assembly 52 is secured through fixed mounting to frame 40 to provide transmission of oscillatory vibrations which, in turn, are imparted to the electrode holder 12 and forward upper surface 44. Coil assembly 52 includes a wound coil 54 connected for energization at each end via input leads 30 and 32, and a core 56 is axially disposed in movable disposition through coil 54. The core 56, as shown in the FIG. 1 illustrations, is comprised of two different materials, e.g., a ferrite material 58 and a non-ferrite material 60, these being suitably bonded together along a central, transverse plane 62. The coil assembly 52, i.e. the wire wound coil 54, is suitably affixed in secure position to frame 40 as denoted schematically by dash-lines 64, while the core 56 is resiliently mounted with respect to frame 40, as by a spring 66 secured at one end to frame 40 and at the other end to the end of non-ferrite core portion 60. Energization of coil 54 will then cause axial reciprocation of core 56 at amplitude determined by constants of spring 66 core mass, and voltage across the coil. Such mass vibration is transmitted as opposed reaction through frame 40 into electrode holder 12 and the electrode or welding rod 14.

OPERATION

In normal welding procedures, particular reference being made to a-c machines, it is an occurrence and especially for the novice to create a condition of sticking or freezing of the electrode when the electrode is first touched to the work in the cold condition to set up arc contact. That is, the electrode, when first touched to the work is cold and an arc will initiate when the a-c voltage goes toward its maximum value, i.e. either maximum positive or maximum negative. This initial arc will melt the skin on the tip of the electrode and it will also initiate melt of the proximate material of the work piece, but sufficient heat will not have been generated to keep this metal molten while the voltage swings back through zero. If the electrode or welding rod is then in contact with the work, as is the occurrence when striking the arc, it will freeze to the work while the voltage is at zero.

Ideally, the electrode should be placed in or near contact with the work when the voltage is at or near its maximum positive or negative value, and it should be withdrawn a few thousandths of an inch while the voltage passes through zero between each maxima. This process should be repeated in synchronization with the arc voltage for a few cycles until after the electrode and weld puddle have become sufficiently heated to remain molten or plastic through the zero voltage times. In this condition, it is easy to hold the arc and the welding process can continue unimpeded.

The welding aid 10 provides an electromechanical device which serves to avoid the sticking possibility through the puddle heatsup period. The welding aid 10 is affixed to the electrode holder 12 through fastening of frame 40, and the solenoidal coil 54 is energized via a-c input on leads 30 and 32. Energization to inputs 26 and 28 of leads 30 and 32 may be taken directly from leads 21 and 23 from primary power input, in which case it would be the usual a-c welding machine energizing power, usually 60 cycle 110/220 volt electrical power. Any power source may be used which has a 0° or 180° electrical phase relationship to primary power for power supply 18. That is, a standard 110 volt power outlet on a separate circuit from the welder primary power could be used provided it is not supplied by another leg of a three-phase distribution system. Such an arrangement would result in a 120° phase relationship with the primary power for power supply 18 and would give undesirable reaction. In other cases it may be desirable to utilize the L-C-R circuit 34, of well-known type, for fine adjustment of the phase of oscillation of coil assembly 52 to an optimum synchronization relative to current application via leads 20 and 22 between work holder 50 and work piece 16. The following operation proceeds with respect to the generalized application wherein no L-C-R circuit adjustment is utilized.

Energization of welding aid 10, as attached to the electrode holder 12, will cause the electrode holder 12 and welding rod 14 to vibrate at twice the frequency at which the welding voltage is oscillating. When properly tuned in phase, the welding aid 10 will cause the welding rod 14 to be driven into the work piece 16 whenever the welding voltage is going toward a maximum, either positive or negative. It will then withdraw the electrode or rod 14 after the maximum voltage point has been reached and before the voltage decreases to zero. This action may be sustained throughout the welding process or, through appropriate switching circuitry, it may be controlled to be de-energized after a molten weld puddle has been formed, e.g., after about two cycles of operation. It is expected that best results would be achieved by allowing the welding aid 10 to remain energized throughout the welding process as it enables still another advantage. That is, it enables the formation of a finer textured weld bead since the droplets of molten metal are shaken from the electrode at a uniform rate. Also, the weld puddle is agitated, causing slag and other impurities to float to the surface more effectively.

Energization of the coil assembly 52 enables optimum vibration effect due to the fact that the ferrite portion 58 of the core 56 is axially displaced from the centrod at the coil 54. That is, the lower half 58 of core 56 is formed from a suitable ferrite, e.g. soft iron core material, while the upper non-ferrite portion 60 is formed from magnetically unresponsive material such as brass to maintain the centroid of ferrite material 58 axially displaced with respect to the centroid of the coil 54. Energization of coil 54 then has the effect of a doubling action as regards input voltage waveform versus mechanical oscillation. Each excursion of current from zero to a maximum, whether negative or positive in polarity, will result in an upward movement of core 56 within coil 54 against spring tension of spring 66 such that there is, effectively, two complete cycles of mechanical vibration for each single cycle of input energizing current as applied between leads 30 and 32. Accordingly, synchronous reactive movement relative to oscillation of coil core 56 is imparted through frame 40 and electrode holder 12 to the electrode or welding rod 14 to displace its conductive tip optimally relative to the work surface of work piece 16.

FIG. 2 illustrates a coil assembly 70 of slightly different type which may be utilized in the welding aid 10 of FIG. 1. Thus, a solenoid-type coil 72 receives a ferrite core 74 in axially movable disposition. Coil 72 is energized by input from a pair of a-c input leads 76 and 78 as derived from a suitable power source. The coil assembly 70 manages to provide its frequency doubling effect due to the fact that core 74 is maintained in an offset axial position relative to coil 72 by means of fixed spring tension denoted schematically by dash-lines 80. Thus, energization of coil 72 effects repeated pulsations of electromagnetic energy, each of which causes a complete vibrational cycle of spring-supported core 74. Reaction to the movement of the mass of core 74 is then transmitted by suitable frame affixture through holder 12 to electrode 14 in the usual manner to effect a desirable manipulation of the end of the electrode 14 relative to work piece 16 (as in FIG. 1).

FIG. 3 discloses yet another alternative form of coil assembly 82 which may enable certain other desirable design advantages. In this case, core 84 of coil assembly 82 is affixed at its lower end to an upper surface 44 of electrode holder 12 while a solenoid-type coil 86 is movably disposed therearound. The core 84 consists of a ferrite upper portion 88 suitably bonded at a juncture point 90 to a lower non-ferrite portion 92, e.g., brass, which is, in turn, securely affixed as by welding or conventional fastener to upper surface 44 of rod holder 12. The coil 86 is constructed so that lower coil former flange 94 is secured to positioning spring 96 to support coil 86 resiliently about the core 84. A-c input current via leads 98 and 100 are then applied to energize coil 86 thereby to drive the internally reciprocated ferrite portion 88 of core 84 to impart the desirable doubled mechanical oscillation to electrode 14. Operation of the system is similar to that of FIG. 1.

FIG. 4 illustrates still another form of coil assembly 110 which is particularly adaptable for certain fabrication methods. The coil assembly 110 is housed within a frame 112 securely affixed to upper surface 44 of holder 12. Within frame 112 there is disposed, in secure affixture, a solenoid-type coil 114 having an off-center or axially displaced core element 116 resiliently supported by diaphgram-like spring member 118 to reciprocate within the axial coil space 120. The core 116 is disposed in off-set relationship to the plane of coil 114, and will provide a frequency doubling effect, i.e. two complete mechanical oscillations in response to each cycle of a-c electrical input to coil 114.

In any of the above-disclosed coil assemblies, the operation is essentially the same as that which was previously set forth with respect to FIG. 1. Energization of the solenoid-like coil will produce an electromagnetic field which, in turn, tends to draw the soft iron core from off-center disposition toward the center of the coil, and this action tends to provide a frequency doubling effect as regards the mechanical vibration versus electrical oscillation of the a-c input. After the initial eight or 10 cycles of input energy, a melt condition is set up in the work piece and established at an optimum consistency which avoids the sticking danger. Thereafter, the plastic or melt condition of the work piece material allows full swing of the electrode as it encounters no solid contact position with the work piece, and sticking or electrode freeze can no longer occur. The operator may then proceed in a normal fashion to complete the weld, with the electrode out of contact at a desirable spacing. In some cases it may be desirable to employ an L-C-R circuit to adjust the phase of input voltage to the coil of the welding aid. This will have the effect of a phase or time delay which serves to avoid sticking due to the inherent time lag in re-solidification of the work piece material from its plastic condition.

The foregoing discloses a novel device which can be readily assembled in combination with a manual electrode holder as employed in electric arc welding. Such a device is easily constructed at minimum expense and requirements as to construction tolerance such that the device is capable of carrying out a most advantageous function when employed by either the novice or professional welder or welders working in poor light and/or access conditions. It should be understood that, in addition to the various alternatives shown in the attached drawing, there are many design variations of the coil and core assembly which might be selected in constructing such a welding aid device. Further, it is contemplated that various other forms of conventional fastener, housing assembly, and other state-of-the-art fabrication techniques might find full application in development and construction of different commercial forms of the invention.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:

1. A welding aid device, comprising:

a hand held electrode holder adapted to receive a consumable welding electrode in operative position;

frame means connected to said electrode holder;

coil means having energizing inputs and being axially aligned with said electrode and rigidly supported relative to said frame means;

core means constructed of magnetically responsive material and being disposed in axially movable relationship within said coil means, said core means structure being elongated as formed from ferrite and non-ferrite portions affixed in end-to-end relationship such that said ferrite portion is maintained in off-centered relationship to said coil means;

spring means secured to both said core means and said frame means to maintain said core means in predetermined position relative to said coil means and said frame means; and a source of alternating current electrical power input for connection to said energizing inputs of said coil means.

2. A welding aid as set forth in claim 1 wherein said spring means comprises:

spring means having one end secured to said frame means and the other end secured to said core means to maintain the center of mass of said core means displaced to one axial end of said coil means in off-center relationship.

3. A welding aid as set forth in claim 1 which is further characterized in that:

said coil means is formed as a relatively flatwound coil having a core space with radial dimension greater than the radial thickness of said coil, and said core means being greater in radial dimension than in thickness as supported in off-center relationship in said core space.

4. A welding aid device as set forth in claim 1 wherein:

said source of electrical power is an a-c connection taken in parallel from the same primary source which energizes said arc welding power supply.

5. A welding aid device as set forth in claim 4 which is further characterized to include:

adjustable L-C-R circuit means connected between said primary power source and said a-c connection to said coil means.

* * * * *